(12) United States Patent
Bondurant

(10) Patent No.: US 8,046,509 B2
(45) Date of Patent: Oct. 25, 2011

(54) COMMONALITY FACTORING FOR REMOVABLE MEDIA

(75) Inventor: Matthew D. Bondurant, Superior, CO (US)

(73) Assignee: Prostor Systems, Inc., Boulder, CO (US)

( * ) Notice: Subject to any disclaimer, the term of this patent is extended or adjusted under 35 U.S.C. 154(b) by 184 days.

(21) Appl. No.: 12/167,872

(22) Filed: Jul. 3, 2008

(65) Prior Publication Data

US 2009/0013129 A1    Jan. 8, 2009

Related U.S. Application Data

(60) Provisional application No. 60/948,387, filed on Jul. 6, 2007, provisional application No. 60/948,394, filed on Jul. 6, 2007.

(51) Int. Cl.
*G06F 13/12* (2006.01)

(52) U.S. Cl. ............ 710/68; 710/62; 710/65; 710/74

(58) Field of Classification Search .................. None
See application file for complete search history.

(56) References Cited

U.S. PATENT DOCUMENTS

| | | | |
|---|---|---|---|
| 5,990,810 A | 11/1999 | Williams | |
| 6,704,730 B2 | 3/2004 | Moulton et al. | |
| 6,810,398 B2 | 10/2004 | Moulton | |
| 7,065,619 B1 | 6/2006 | Zhu et al. | |
| 7,137,011 B1 | 11/2006 | Hariri et al. | |
| 7,197,189 B2 * | 3/2007 | Adelmann | 382/239 |
| 7,403,451 B2 * | 7/2008 | Goodman et al. | 369/30.01 |
| 7,533,323 B2 | 5/2009 | Alaimo et al. | |
| 2006/0059207 A1 | 3/2006 | Hirsch et al. | |
| 2007/0097534 A1 | 5/2007 | Evans et al. | |
| 2007/0208788 A1* | 9/2007 | Chakravarty et al. | 707/204 |
| 2008/0133536 A1 | 6/2008 | Bjorner et al. | |
| 2009/0013140 A1 | 1/2009 | Bondurant et al. | |

OTHER PUBLICATIONS

Broder, Andrei Z., "Some applications of Rabin's fingerprinting method", no date, pp. 1-10.

Cox, Landon P. et al., "Pastiche: Making Backup Cheap and Easy", Department of Electrical Engineering and Computer Science, Univ. of Michigan, Ann Arbor, MI, Proceedings of the 5th Symposium on Operating Systems Design and Implementation, Boston, MA, Dec. 9-11, 2002, 14 pages.

(Continued)

*Primary Examiner* — Eron J Sorrell
(74) *Attorney, Agent, or Firm* — Kilpatrick Townsend & Stockton LLP

(57) ABSTRACT

Systems and methods for commonality factoring for storing data on removable storage media are described. The systems and methods allow for highly compressed data, e.g., data compressed using archiving or backup methods including de-duplication, to be stored in an efficient manner on portable memory devices such as removable storage cartridges. The methods include breaking data, e.g., data files for backup, into unique chunks and calculating identifiers, e.g., hash identifiers, based on the unique chunks. Redundant chunks can be identified by calculating identifiers and comparing identifiers of other chunks to the identifiers of unique chunks previously calculated. When a redundant chunk is identified, a reference to the existing unique chunk is generated such that the chunk can be reconstituted in relation to other chunks in order to recreate the original data. The method further includes storing one or more of the unique chunks, the identifiers and/or the references on the removable storage medium.

18 Claims, 9 Drawing Sheets

OTHER PUBLICATIONS

Denehy, Timothy E. et al., "Duplicate Management for Reference Data", RJ 10305, Oct. 7, 2003, Computer Science, IBM Research Report, Duplicate Management for Reference Data, pp. 1-14.

Douglis, Fred et al., "Application-specific Delta-encoding via Resemblance Detection", Mar. 31, 2003, 19 pages.

Karp, Richard M. et al., Effiecient randomized pattern-matching algorithms, IBM J. Res. Develop., vol. 31, No. 2, Mar. 1987, pp. 249-260.

Korn, David G. et al., "Engineering a Differencing and Compression Data Format", AT&T Laboratories—Research, Proceedings of the USENIX Annual Technical Conference, Monterey, CA, Jun. 10-15, 2002, pp. 1-10.

Kulkarni, Purushottam et al., "Redundancy Elimination Within Large Collections of Files", Proceedings of the General Track: 2004 USENIX Annual Technical Conference, Boston, MA, Jun. 27-Jul. 2, 2004, 14 pages.

Moreton, Tim D. et al., "Storage, Mutability and Naming in Pasta", Univ. of Cambridge Comouter Laboratory, Cambridge UK, no date, 5 pages.

Muthitacharoen, Athicha et al., "A Low-bandwidth Network File System", MIT Laboratory for Computer Science, Cambridge, MA 02139, USA, no date, 2 pages.

Policroniades, Calicrates et al., "Alternatives for Detecting Redundancy in Storage Systems Data", Computer Laboratory, Cambridge University, Proceedings of the General Track: 2004 USENIX Annual Technical Conference, Boston, MA, Jun. 27-Jul. 2, 2004, 14 pages.

Rabin, Michael O., "Fingerprinting by Random Polynomials", Department of Mathematics, The Hebrew Univ. of Jerusalem, no date, 14 pages.

You, Lawrence L. et al., "Evaluation of Efficient Archival Storage Techniques", no date, pp. 1-6.

U.S. Appl. No. 12/167,867 filed Jul. 3, 2008, Final Office Action mailed Dec. 7, 2010, 19 pages.

U.S. Appl. No. 12/167,867 filed Jul. 3, 2008, Office Action mailed May 21, 2010, 15 pages.

* cited by examiner

COMMONALITY FACTORING FOR REMOVABLE MEDIA

This application claims the benefit of and is a non-provisional of both co-pending U.S. Provisional Application Ser. No. 60/948,387 filed on Jul. 6, 2007; and U.S. Provisional Application Ser. No. 60/948,394 filed on Jul. 6, 2007, which are hereby expressly incorporated by reference in their entirety for all purposes.

This application incorporates by reference U.S. patent application Ser. No. 11/194,137, filed on Jul. 28, 2005, and U.S. application Ser. No. 12/167,867, filed on even date herewith, entitled "Hardware Acceleration of Commonality Factoring on Removable Media", in their entirety for all purposes.

BACKGROUND OF THE DISCLOSURE

The present invention generally relates to data storage systems and, but not by way of limitation, to data storage systems that store information on removable media.

Conventional backup involves of a series of full, incremental or differential backups that saves multiple copies of identical or slowly changing data. This approach to backup leads to a high level of data redundancy.

For years, there has been a considerable disparity between the prices of tape and disk-based storage systems with tape-based storage being less expensive. Therefore, conventional data storage solutions have been tape based storage systems that compress data using conventional algorithms for an average compression ratio of about 2:1. Advantageously, tape-based storage systems use removable tape cartridges that can be taken to off-site location for disaster recovery. However, the process of recovering data in a tape based storage system is slow, complex and unreliable.

Data de-duplication, known as commonality factoring, is a process of reducing storage needs by eliminating redundant data. Data de-duplication is a disk-based data storage system that greatly reduces disk space requirements. However, disk-based data storage systems including de-duplication methods are not easily exported to removable media. In order to export de-duplicated data to removable media, the de-duplicated data has to be first reformulated to its original format and then be recorded on removable tape cartridges, thereby, requiring more storage space than the de-duplicated version.

Data de-duplication is a resource intensive process, which is implemented in software as part of the commonality factoring solutions. Due to the intensive computational process, top of the line multi-core/multi-processor servers are used to provide adequate performance to perform the de-duplication process. The amount of performance gained by the use of multi-core/multi-processor servers depends on the algorithms used and their implementation in software. However, the overall cost and power consumption of these multi-core/multi-processor servers are high.

SUMMARY

Systems and methods for commonality factoring for storing data on removable storage media are described. The systems and methods allow for highly compressed data, e.g., data compressed using archiving or backup methods including de-duplication, to be stored in an efficient manner on portable memory devices such as removable storage cartridges. The methods include breaking data, e.g., data files for backup, into unique chunks and calculating identifiers, e.g., hash identifiers, based on the unique chunks. Redundant chunks can be identified by calculating identifiers and comparing identifiers of other chunks to the identifiers of unique chunks previously calculated. When a redundant chunk is identified, a reference to the existing unique chunk is generated such that the chunk can be reconstituted in relation to other chunks in order to recreate the original data. The method further includes storing one or more of the unique chunks, the identifiers and/or the references on the removable storage medium.

In one embodiment, an apparatus for storing data with a removable medium is disclosed. The apparatus includes a chunk module, a hash module and a search module. The chunk module is configured to receive an original data stream and break the original data stream into chunks. The hash module, which is coupled to the chunk module, is configured to calculate an identifier for each chunk and to store the identifiers. The search module is coupled to the removable medium. The search module is configured to determine, based on the identifiers, whether each chunk is unique and store information on the removable medium. The information includes at least two of a following: the unique chunks, descriptors describing each of the unique chunks, and references indicating a sequence of the unique chunks. The references are usable to reconstruct the original data stream. The removable medium includes a drive cartridge.

In another embodiment, the present disclosure provides a process for storing data with a number of removable media. The process comprises steps of breaking: an original data stream into chunks; calculating an identifier for each chunk; storing the identifiers; determining, based on the identifiers, whether each chunk is unique; and storing information on the number of removable media. The information includes at least two of a following: a stream of the unique chunks, a stream of descriptors describing each of the unique chunks, and a stream of references indicating a sequence of the unique chunks. The stream of references is usable to reconstruct the original data stream. The stream of references are stored in each medium and includes a medium identifier. The medium identifier allows correlation of the references to the chunks on the different removable media.

In yet another embodiment, the present disclosure provides a process for storing data on a removable storage unit. The process comprises steps of: breaking original data into chunks; calculating an identifier for each chunk; storing the identifiers in a low latency memory; determining, based on the identifiers, whether each chunk is unique; and storing information on the storage unit. The information includes at least two of a following: the unique chunks, descriptors describing each of the unique chunks, and references indicating a sequence of the unique chunks used to reconstruct the original data.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWING

The present disclosure is described in conjunction with the appended figures.

DETAILED DESCRIPTION OF THE INVENTION

Figure 1:
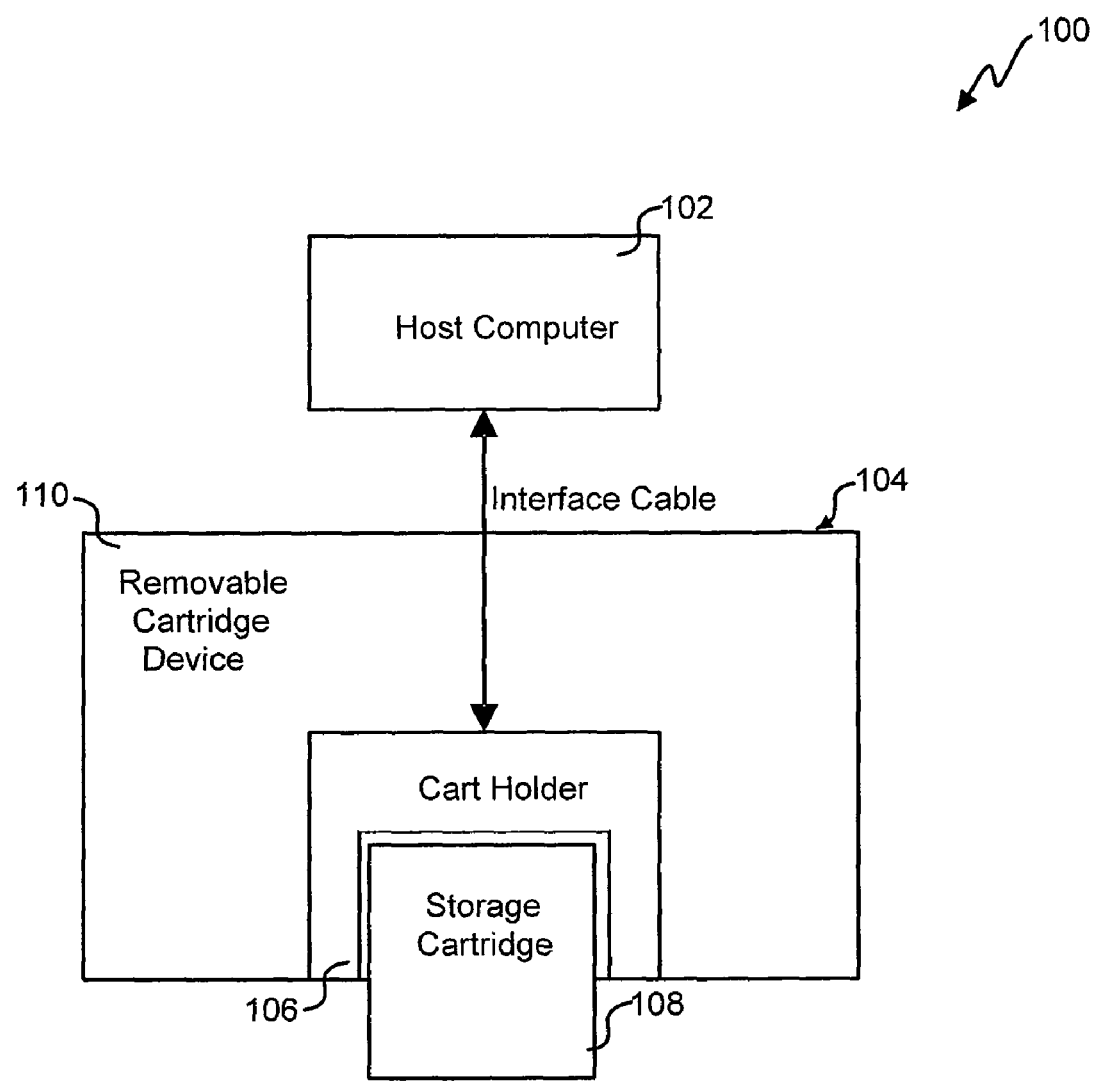
FIG. 1 depicts a block diagram of an embodiment of a data storage system.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It should be understood that various changes may be made in the function and arrangement of elements without departing from the spirit and scope of the invention as set forth in the appended claims.

This disclosure relates in general to data storage systems used for data backup, restore and archive applications. It specifically relates to a new generation of removable data cartridges housing a hard disk drive (HDD) or flash memory as the storage medium. Throughout the specification, HDD may be used but it is to be understood that flash memory or a solid state disk (SSD) drive could be used in the alternative.

Data compression is the process of encoding information using fewer bits than an unencoded representation would use by employing specific encoding schemes. Compression helps reduce the consumption of expensive resources such as hard disk space or transmission bandwidth. Compressed data is decompressed before use. One very simple means of lossless compression is run-length encoding, where large runs of consecutive identical data values are replaced by a simple code with the data value and length of the run. The Lempel-Ziv (LZ) compression methods are one of the known algorithms for lossless storage. The LZ methods utilize a table-based compression model where table entries are substituted for repeated strings of data.

A typical backup process consists of a series of incremental backups and full backups, generating multiple copies of identical or slowly changing data, and thus leading to a high level of data redundancy. In commonality factoring (or de-duplication) technique, byte streams of data are compared to other byte streams to look for duplicates; and when a duplicate byte stream is found, a pointer is established back to the initial byte stream instead of storing the duplicate. Thus, a significant reduction of the size of stored data can be achieved.

Embodiments of the present invention are directed to methods and computer program products for storing more data on a single data cartridge than the use of the LZ compression methods above would allow. The present invention allows the effective capacity of the data cartridge to closely compete with that of a Linear Tape Open (LTO) tape cartridge. This is achieved through implementation of commonality factoring (or de-duplication) in the HDD of the data cartridge. Furthermore, the present invention provides methods for optimizing the use of commonality factoring in multiple cartridge situations.

A method for storing data on a removable medium according to the present invention comprises steps of: (1) breaking an original data stream into chunks; (2) calculating an identifier for each chunk; (3) storing the identifiers in a low latency memory (e.g., flash or RAM); (4) determining, using a complete set of identifiers stored in the low latency memory, whether each chunk is unique in that the same chunk has not been found in the previous chunks; and, (5) storing on the removable medium: (a) a stream of the unique chunks as they are received, (b) a stream of descriptors describing each of the unique chunks, and (c) a stream of references indicating a sequence of the unique chunks usable to reconstruct the original data stream.

According to one embodiment of the present invention, the step of breaking the original data stream into chunks is carried out by determining chunk boundaries through comparison between a subset of the bits returned from a sliding window algorithm and a predetermined value, whereby a match to the predetermined value designates the chunk boundary. In this embodiment, Rabin fingerprinting may be used for the sliding window algorithm.

According to another embodiment, the step of calculating the unique identifiers is performed by use of Secure Hash Algorithm-1 (SHA-1).

According to yet another embodiment, the step of determining whether each chunk is unique is performed through a search of a hash table indexed by the identifier. In this embodiment, the step of determining whether each chunk is unique may include a step of using the length of the chunk to confirm its uniqueness.

According to yet another embodiment, the step of determining whether each chunk is unique is performed through a search of a hash table indexed by a portion of the identifier followed by a search of a list indexed by the remainder of the identifier. In this embodiment, the step of determining whether each chunk is unique may include a step of using the length of the chunk to confirm its uniqueness.

According to yet another embodiment, the step of determining whether each chunk is unique is performed through a search of a hash table indexed by a portion of the identifier followed by a search of a binary tree indexed by the remainder of the identifier. In this embodiment, the step of determining whether each chunk is unique may include a step of using the length of the chunk to confirm its uniqueness.

According to yet another embodiment, the step of storing streams further includes a stream of host objects comprising virtual tape volumes for an existing tape format.

According to yet another embodiment, the locations of the streams stored on the removable medium are managed by a traditional file system by treating each stream as a file, and thus they are not necessarily contiguous in terms of Logical Block Addresses (LBAs) on the removable medium.

According to yet another embodiment, the locations of the streams stored on the removable medium are managed directly and are contiguous in terms of LBAs on the removable medium. The streams appear in two areas, each for containing two streams, fixed in size based on the capacity of the partition of the medium. Within each fixed area the two streams grow towards one another, with the remaining free space logically located between the two streams.

According to yet another embodiment, each of the streams further comprises an embedded additional level of Error Correction Coding (ECC).

The present invention further provides a computer program product for storing data on a removable medium, the computer program product being embodied in a computer readable medium and comprising computer instructions for: receiving an original data stream; breaking the original data stream into chunks; calculating an identifier that serves as a fingerprint for each chunk; storing the identifiers in a low latency memory; determining, using a complete set of the identifiers stored in the low latency memory, whether each chunk is unique in that the same chunk has not been found in the previous chunks; and storing a stream of the unique chunks and associated metadata on the removable medium.

The present invention further provides a method for storing data on a plurality of removable media, comprising the same steps as those in the method for storing data on a removable medium, wherein the stream of references stored in each medium includes a medium identifier in each entry for allowing the references to the chunks on the different removable media. According to one embodiment, the medium identifiers may be stored in the metadata of the media.

The present invention further provides a computer program product for storing data on a plurality of removable media, the computer program product being embodied in a computer readable medium and comprising the same computer instructions in the computer program product for storing data on a removable medium, wherein the associated metadata stored in each medium includes a medium identifier in each entry for allowing the references to the chunks on the different removable media.

The present invention further provides a method for streamlining an algorithm for storing data on a plurality of removable media, comprising the same steps as those in the method for storing data on a plurality of removable media, wherein a subset of the overall data set is stored on each medium, and subsequent versions of the subset are stored on the same medium.

The present invention further provides a computer program product for streamlining an algorithm for storing data on a plurality of removable media, the computer program product being embodied in a computer readable medium and comprising the same computer instructions in the computer program product for storing data on a plurality of removable media, wherein a subset of the overall data set is stored on each medium, and subsequent versions of the subset are stored on the same medium.

In the following, the method for storing data according to the present invention is explained in detail with sections individually describing: breaking the incoming data stream into smaller chunks of data which can be analyzed for redundancy; calculating an identifier for each chunk that can be used to uniquely determine whether the same data chunk has been stored; determining if the data chunk has previously been stored by searching a database of the identifiers; and organizing the data chunks and identifiers so that the original data stream can be regenerated.

Referring first to FIG. 1, an embodiment of a data storage system 100 is shown. The data storage system 100 may include a host computer 102 and a removable drive bay 104. The host computer 102 includes a processor and an expansion bus. The expansion bus is coupled to the processor and is configured to transfer data to the drive bay 104 via any standard interface. The removable drive bay 104 may include a removable cartridge device 110 and a removable cartridge holder 106. The host computer 102 may be communicatively coupled with removable cartridge device 110. By way of example, the removable cartridge device 110 interface coupled to the host computer 102 may be any version of Small Computer System interface (SCSI), a Fiber Channel (FC) interface, an Ethernet interface, an Advanced Technology Attachment (ATA) interface, or any other type of interface that allows the removable cartridge device 110 to communicate with the host computer 102. The cartridge holder 106 can be a plastic socket and can physically mount to a circuit board of the removable cartridge device 110. The cartridge holder 106 may further include an eject and lock mechanism. A removable storage cartridge 108 provides storage capability for the data storage system 100, wherein the storage cartridge 108 is removably coupled to the removable cartridge device 110. The portable storage cartridge 108 is also optionally locked in the cartridge holder 106. In an alternative embodiment, the host computer 102 may be communicatively coupled with cartridge holder 106 through an interface cable 112.

Figure 2:
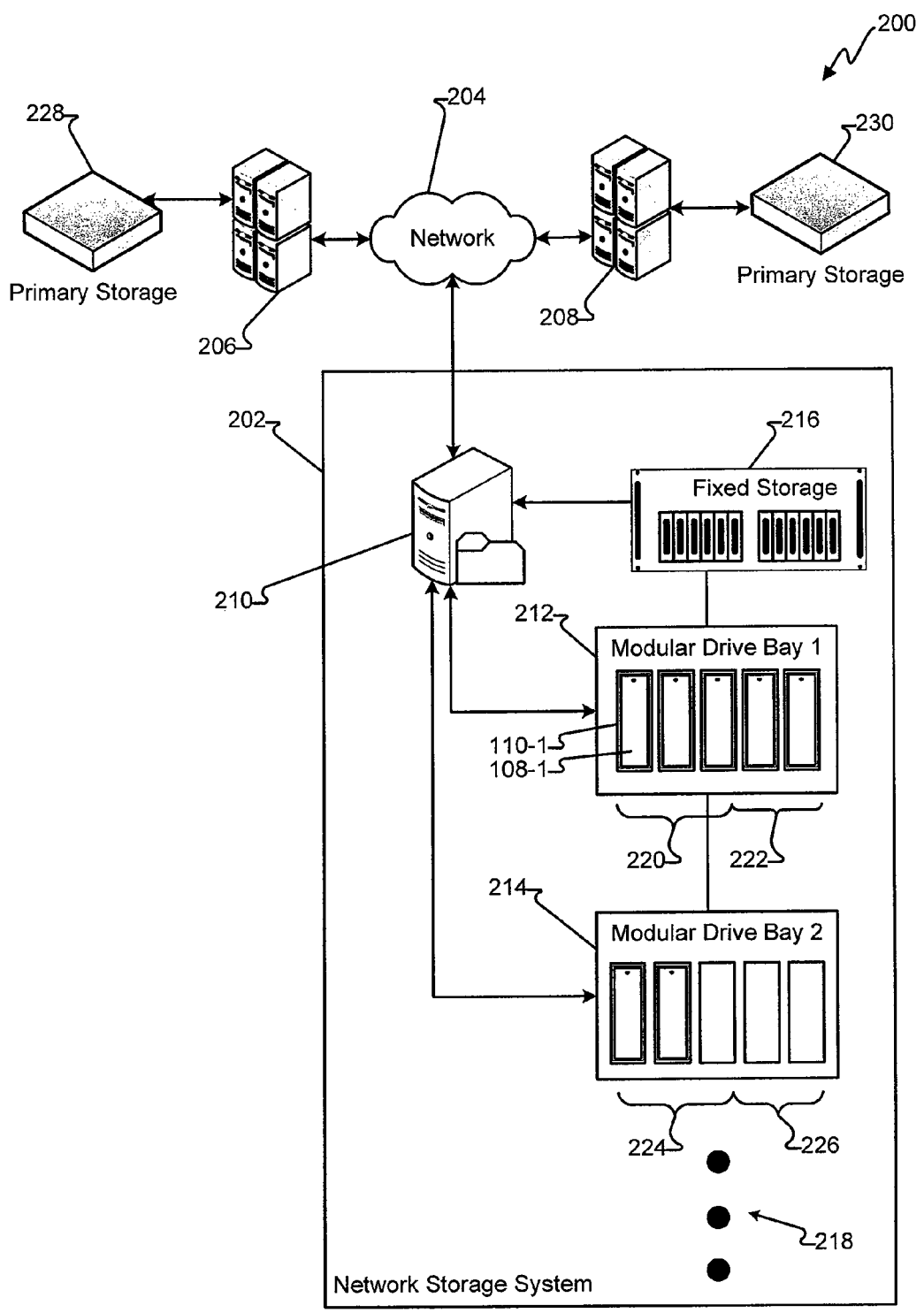
FIG. 2 depicts a block diagram of an embodiment of a backup/archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In some embodiments, the systems that communicate with the network storage system 202 comprise applications, application servers, other servers, peripherals, other devices, and other systems that archive data on the network storage system 202. For example, application server 206 and/or application server 208 can store archival data on the network storage system 202. The application servers 206 any 208 may each be one or more of an application, a peripheral device, a system, a network component, or other software function or hardware device that may store archived data. Hereinafter, all functions, systems, processes, hardware devices that may store archived data will be referred to as an application or application server.

The network storage system 202 comprises one or more components that may be encompassed in a single physical structure or be comprised of discrete components. In some embodiments, the network storage system 202 includes an archiving system appliance 210 and one or more removable storage cartridge 108-1 connected or in communication with a removable cartridge device 110-1. The archiving system appliance 210 can be, for example, the host computer 102 of FIG. 1. In alternative embodiments, a modular drive bay 212 and/or 214 includes two or more removable cartridge devices 110-1 that can each connect with a removable storage cartridge 108-1. Thus, the modular drive bays 212 and 214 provide added storage capacity because more than one removable storage cartridge 108-1 can be inserted and accessed using the same archiving system appliance 210. Further, each removable cartridge device 110-1 in the modular drive bays 212 and 214 is, in some embodiments, separately addressable allowing the archiving system appliance 210 to configure the removable storage cartridges 108-1 in the modular drive bays 212 and 214 into groups of one or more removable storage cartridges 108-1. Two or more modular drive bays 212 and 214, in some embodiments, are included in the network storage system 202, as evidenced by the ellipses 218. Thus, as more data storage capacity is required, more modular drive bays may be added to the network storage system 202.

The exemplary hardware architecture in FIG. 2 provides near limitless capacity as more removable storage cartridges 108-1 can be added to existing modular drive bays 212 or 214 until the modular drive bays 212 and 214 hold all possible removable storage cartridges 108-1, then more modular drive bays are added to the network storage system 202. Further, removable storage cartridges 108-1 may be replaced as the removable storage cartridges 108-1 near their storage capacity. The removed storage cartridges 108-1, in embodiments, are physically stored if and until the data on the removable storage cartridges 108-1 needs to be retrieved. If the data on the removable storage cartridges 108-1 needs to be retrieved, the removable storage cartridges 108-1 may be inserted into one of the removable cartridge device 110-1 of a modular drive bay 212 or 214, and the information retrieved from the connected removable storage cartridges 108-1.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

The archiving system appliance 210, in embodiments, is a closed system that only allows access, to the network storage system 202, by applications or other systems and excludes access by users. Thus, the archiving system appliance 210 provides protection to the network storage system 202.

In embodiments, the two or more modular drive bays 212 and 214, having each one or more inserted removable storage cartridges 108-1, form a removable disk array (RDA). The archiving system appliance 210 can configure the RDA into one or more independent file systems. Each application server 206 or 208, requiring archiving of data, may be provided a view of the RDA as one or more independent file systems. In some embodiments, the archiving system appliance 210 logically partitions the RDA and logically associates one or more removable storage cartridges 108-1 with each logical partition. Thus, the one or more removable storage cartridges 108-1 comprising the logical partition appear as an independent file system. For example, the archiving system appliance 210 creates a first logical drive, e.g., drive "A:\", and a second logical drive, e.g., drive "B:\". The logical drives may comprise one or more removable storage cartridges 108-1. For example, the three removable storage cartridges represented by bracket 220 correspond to the first logical drive while the two removable storage cartridges represented by bracket 222 correspond to the second logical drive. As such, the amount of capacity for each logical drive can be configured depending on the number of removable storage cartridges 108-1 included as part of the logical drive. Further, each logical drive, in embodiments, has a set of rules or characteristics specific to the drive. For example, if the drive stores a certain type of information that requires the data to be eliminated every year, the data on the logical drive may be eliminated once a year. In embodiments, a user may configure how the logical partitions are created and the storage requirements for each logical partition.

In further embodiments, the archiving system appliance 210 provides an interface for application server 206 and application server 208 that allows the application servers 206 and 208 to communicate archival data to the network storage system 202. The archiving system appliance 210, in embodiments, determines where and how to store the data in a removable storage cartridges 108-1. For example, the application server 206 stores archival data in a first logical drive, such as, the first three removable storage cartridges 220 and the application server 208 stores archival data in a second logical drive, such as, the removable storage cartridges 222. The logical drives are, in embodiments, presented to the application servers 206 and 208 as logical drives where write and read permissions for any one logical drive is specific to one of the application servers. As such, the network storage system 202 provides a multiple and independent file system to each application server 206 and 208 using the same hardware architecture.

Partitioning the storage cartridges into groups such as 220-226, has a benefit when storing de-duplicated data. As discussed above, de-duplicated data can be stored on a plurality of removable media, wherein associated metadata is stored in each medium and includes a medium identifier in each entry for allowing the references to the de-duplicated chunks on the different removable media. Since the different storage cartridge groups are dedicated to different servers, the archiving system appliance 210 can rotate the removable storage cartridges on different schedules. For example, if server 206 is an email server, the three-storage cartridge-set 220 may be stored for a period of 6 months. Whereas, if the server 208 is an accounting server, the two-storage cartridge-set 222 can be stored for three years. In this way, a more efficient storage cartridge archive library may be maintained as opposed to having different kinds of data, with various time periods for elimination, on any given removable cartridge.

In alternative embodiments, the network storage system 202 also comprises a fixed storage 216. The fixed storage 216 may be any type of memory or storage media either internal to the archiving system appliance 210 or configured as a discrete system. For example, the fixed storage 216 can be a Redundant Array of Independent Disks (RAID), such as the Xtore XJ-SA12-316R-B from AIC of Taiwan. The fixed storage 216 provides for storing certain archival data for a shorter period of time where the data may be more easily accessed. In embodiments, the archiving system appliance 210 copies archival data to both the fixed storage 216 and the RDA. If the data is needed in the short term, the archiving system appliance 210 retrieves the data from the fixed storage 216.

In operation, application server 206 stores data into a primary storage 228, which may be a local disk drive or other memory. After some predetermined event, the application server 206 reads data from the primary storage 228, packages the data in a format for transport over the network 204 and sends the data to the network storage system 202 to be archived. The archiving system appliance 210 receives the archival data and determines where the data should be stored. The data is then sent to the fixed storage 216 and/or one or more of the removable storage cartridges 108-1 in one or more of the removable cartridge device 110-1. The data is written to the removable storage cartridges 108-1 for long-term storage. In further embodiments, application server 208 also writes data to a primary storage 230 and sends data to the network storage system 202. In some embodiments, the archival data from application server 208 is stored to a different removable storage cartridges 108-1 because the archival data relates to a different application.

The commonality factoring function may be implemented in hardware, software, or a combination thereof. In various embodiments, the commonality factoring may be implemented in one or more of the following locations: 1) in the host computer 102, 2) in the removable cartridge device 110 and outside the cartridge holder 106, and 3) in the storage cartridge 108. Other embodiments may only include one or more portions of the commonality factoring function in one location and other portions in another location.

Figure 3:
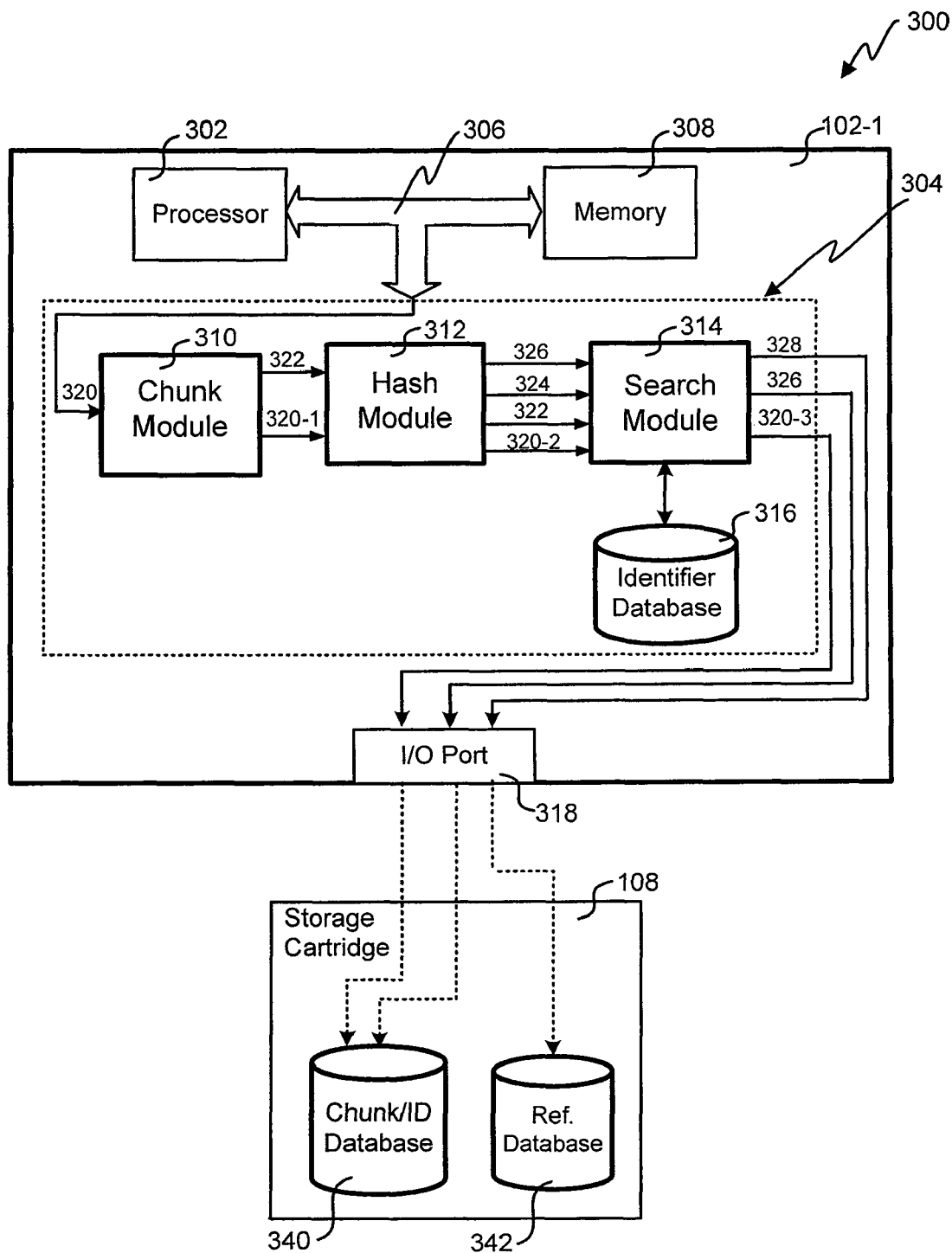
FIG. 3 depicts a block diagram of an embodiment of a commonality factoring system implemented within a host computer.

Referring next to FIG. 3, a block diagram 300 of an embodiment of a commonality factoring system implemented within a host computer is shown. The host computer 102-1 may include a processor 302, a commonality factoring module 304, and a memory 308. The host computer 102-1 further includes an expansion bus 306, which is coupled to the processor 302, the commonality factoring module 304, and the memory 308. The expansion bus 306 is configured to transfer data within the host computer 102-1 to other devices, e.g., the removable storage cartridge 108, via the input/output (I/O) port 318 through any standard interface, as discussed before in relation to FIG. 1.

The commonality factoring module 304 may include a chunk module 310, a hash module 312, and a search module 314. In this embodiment, the chunk module 310 performs the step of breaking an original data stream 320 into chunks. There are two primary methods considered for breaking the data into chunks for analysis: 1) fixed size chunking and 2) variable-size or content-defined chunking.

The first method is to use fixed size chunks and to break up the data stream 320 at predetermined chunk boundaries. The size of the chunks is the primary parameter that will determine the computation, storage, and compression efficiency of the method. The downside of using this method is that if data is inserted in the stream such that the redundant copy is offset relative to the original copy, the redundant copy will not be detected. Table I shows an example of fixed sized chunking method where the redundant copy is not discernable from the original copy due to the offset created between both versions.

TABLE I

Example of Fixed Size Chunking

| The quic | k brown | fox jump | ed over | the lazy | dog |
| A quick | brown fo | x jumped | over th | e lazy d | og |

The issue of byte insertion can be resolved by utilizing the second method, which uses variable sized chunks and breaks up the chunks at content defined boundaries. The chunk boundaries are determined by looking at the result of an algorithm (a fingerprint) calculated over a window of bytes which generates a random distribution of outputs. In order to be practical, the algorithm is computed efficiently on a sliding window of bytes. The chunk boundary is determined by comparing a number of bits in the fingerprint to a single randomly chosen fixed value. The number of bits used in the comparison determines the average chunk size. For instance, by using 13 bits, there is a 1 in 2^13 chance of matching the fixed value; therefore, the average chunk size will be approximately 8 KB. In addition, minimum and maximum chunk sizes are specified to handle exceptional cases. For a given set of duplicate data, there will on average be a chunk boundary within ½ of the average chunk size from both the beginning and end of the duplicate data set. An example of variable-size or content defined chunking is shown in Table II.

TABLE II

Example of Variable-Size or Content-defined Chunking

| The quic | k brown | fox jump | ed over | the lazy | dog |
| A quic | k brown | fox jump | ed over | the lazy | dog |

The chunk module 310 may use different methods and algorithms for determining the content defined boundaries. In one embodiment, the chunk module 302 may use a sliding window checksum method to determine the content defined boundaries. In this embodiment, a content defined fingerprint can be generated by storing a window of bytes (for example 48 bytes) and removing the oldest byte as each new byte is received. An issue with using a simple checksum is that the output does not have the ideal statistical properties. Given that input data has a non-uniform distribution, the output will also end up with a non-uniform distribution.

In an alternative embodiment, the chunk module 310 may use Rabin fingerprinting method for determining the content defined boundaries. Rabin fingerprints can be computed efficiently on a sliding window a byte at a time by using lookup tables to avoid performing the entire polynomial calculations that are described by the algorithm. Using the Rabin algorithm solves the statistical issues with the simple checksum and provides a nearly uniform output distribution independent of the input data.

The chunk module 310 outputs a sequence of data bytes called chunks 320-1 along with an indication 322 whether a chunk boundary has been reached for each sequence of data bytes. This allows the end of each sequence indication 322 and the data chunks 320-1 to be synchronized as they pass on to the hash module 312.

The hash module 312 performs the step of calculating an identifier for each chunk from the sequence of data bytes 320-1. The unique identifier for the data chunk is calculated using one or more cryptographic hash functions such as Message Digest Algorithm 5 (MD5) or Secure Hash Algorithm-1 (SHA-1). This provides a short summary of the data chunk that is extremely unlikely to have a collision against another chunk whose data is not the same. These chunks can be used to perform searches much more efficiently than trying to match the entire data. The hash module 312 outputs a stream of data chunks 320-2, an end of sequence indication 322, a stream of length for each chunk 324, and a stream of identifiers for each chunk 326. The stream of identifiers 326 is then stored into a low latency memory/database 316. As will be described further below in various embodiments, several data structures can be used to store the stream of identifiers 326 into the database 316. By way of example, the stream of identifiers 326 may be stored in the identifier database 316 using a binary tree data structure, an indexed list data structure, or an indexed binary tree data structure.

The search module 314 performs the step of determining whether each chunk is unique by searching the identifier database 316. Where the chunk is found to be unique, the unique chunk and its identifier are stored in a chunk/ID database 340 on the removable storage cartridge 108. If the chunk is not unique, the redundant chunk is discarded and a reference to the existing unique chunk is created such that the redundant chunk can be reconstituted in relation to other chunks in order to regenerate the original data stream 320. The reference to the existing unique chunk is then forwarded to the removable storage cartridge 108 for storage in a reference database 342. The search module 314 contains enough buffering to store output data from the hash module 312 and determine whether each chunk should be discarded or passed on to the remainder of the data path. The search module 314 outputs a stream of unique chunks 320-3, a stream of identifiers for each unique chunk 326, and a stream of references 328.

Figure 4A:
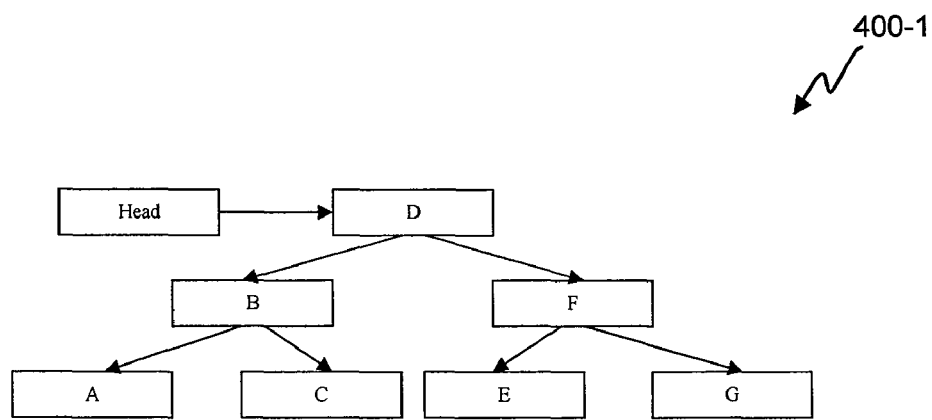
FIGS. 4A, 4B, and 4C illustrate schematic diagrams of alternative embodiments of searchable data structures.

In order to manage the identifier database 316, several possible data structures can be used which trade off speed versus space. All of the storage methods are keyed on the hash value for the data chunk. Referring next to FIG. 4A, an embodiment of a searchable data structure 400-1 for storing identifiers is shown. In this embodiment, a searchable binary tree data structure is used. Given a number of chunks N, this results in a worst case search time of O(log 2 N). The example of FIG. 4A illustrates a simple binary tree of size 7 and height 3, with a root node whose value is D. Thus, any identifier can be located in 3 or fewer steps. In this embodiment, the step of determining whether each chunk is unique is performed through a search of a hash table indexed by the identifier. In this embodiment, the step of determining whether each chunk is unique may also include a step of using the length of the chunk to confirm its uniqueness.

Figure 4B:
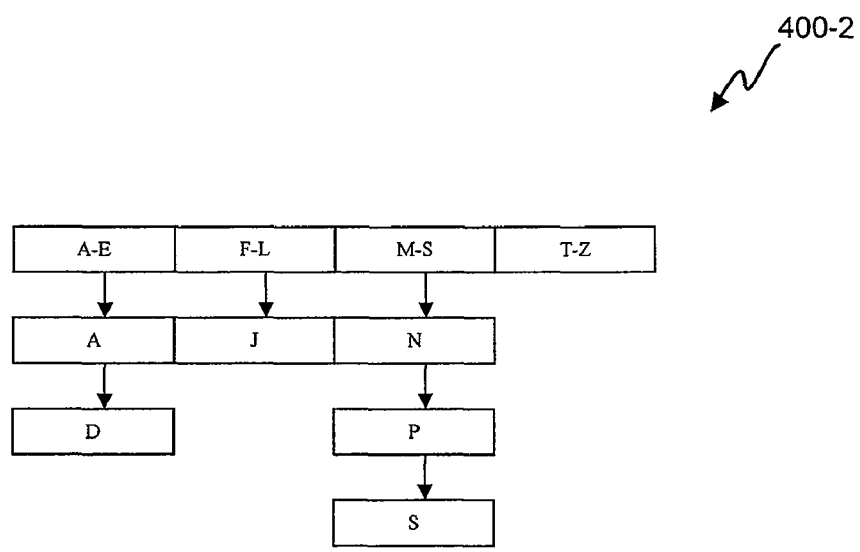

With reference to FIG. 4B, another embodiment of a searchable data structure 400-2 for storing identifiers is shown. The indexed list method is a direct lookup based on a portion of the hash followed by a linear search of the elements matching that hash. Given K bits used for the initial lookup, this results in a worst case search time of $O(N/2^K)$. In this embodiment, the step of determining whether each chunk is unique is performed through a search of a hash table indexed by a portion of the identifier followed by a search of a list indexed by the remainder of the identifier. In this example, N=26 and K=2, and any identifier can be located in 7 or fewer steps after locating the index using the first 2 bits. In this embodiment, the step of determining whether each chunk is unique may also include a step of using the length of the chunk to confirm its uniqueness.

Figure 4C:
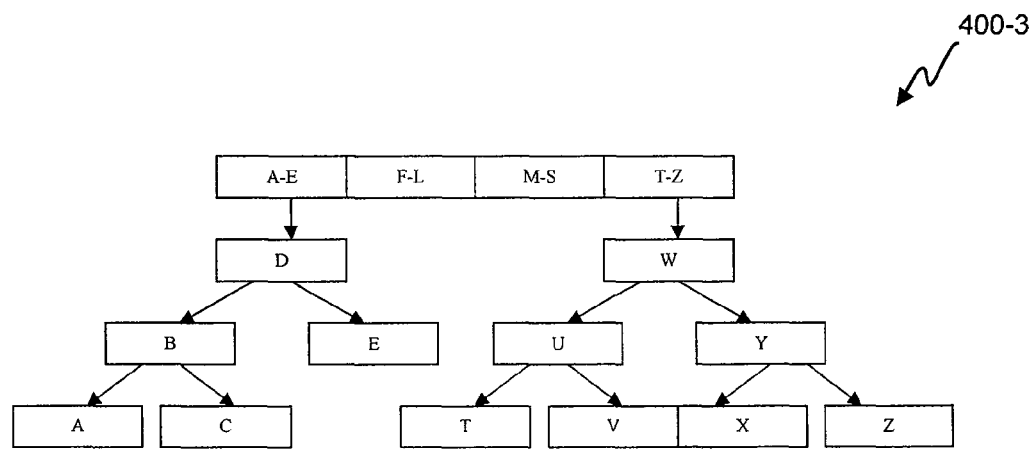

Referring next to FIG. 4C, another embodiment of a searchable data structure 400-3 for storing identifiers is shown. The indexed binary tree method is a direct lookup based on a portion of the hash followed by a binary search of the elements matching that hash. This results in a worst case search time of $O(\log 2 (N/2^K))$. In this embodiment, the step of determining whether each chunk is unique is performed through a search of a hash table indexed by a portion of the identifier followed by a search of a binary tree indexed by the remainder of the identifier. In this example N=26 and K=2, resulting in any identifier being able to be located in 3 or fewer steps, after identifying the index using the first 2 bits. In this embodiment, the step of determining whether each chunk is unique may also include a step of using the length of the chunk to confirm its uniqueness.

When operating in tape-emulation mode, the storage of information can be simplified because random writes are not permitted. In order to implement the data format, one sequential stream is provided for containing all of the data chunks stored in the order they are received. Another sequential stream is provided for containing all of the data chunk descriptors. Yet another sequential stream is provided for containing references to the data chunk descriptors, with an additional indication of whether a given reference is the first reference. Finally, another sequential stream is provided for containing the tape directory as defined for the existing tape format. The benefit of having sequential streams is that when an append occurs, it is easy to determine which data chunks can be deleted because they are stored sequentially. For a device that supports random writes, a reference count is maintained and updated whenever writes occur. This adds additional complexity not required for the stream implementation. The sequential nature of the streams also allows for applying the extra data protection of the tape format Error Correction Coding (ECC) implementation to all of the streams.

Figure 5:
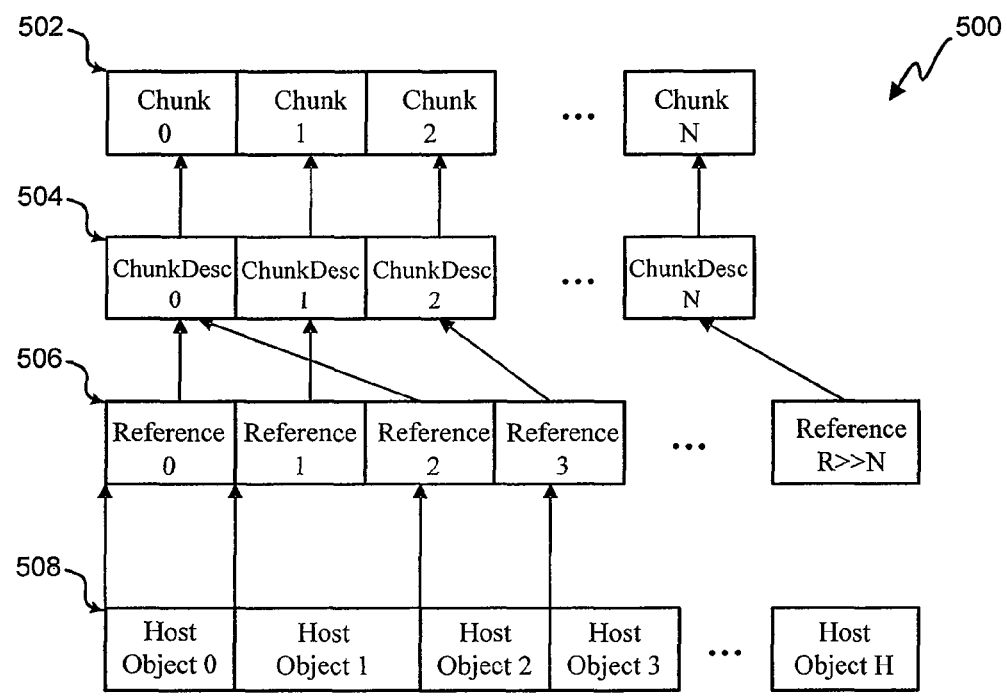
FIG. 5 is a schematic illustration of an example of sequential data streams used to store data on a removable data cartridge.

A schematic illustration of an example of sequential data streams 500 used to store data on a removable storage cartridge is shown in FIG. 5. The chunk data stream 502 contains a sequence of unique data chunks stored to the media. These chunks may have additional data filters applied to them such as Lempel-Ziv Stac (LZS) data compression or Advanced Encryption Standard (AES)-256 data encryption. There is no metadata in the chunk data stream 502; all of the metadata is stored in the other streams.

The chunk descriptor stream 504 contains a sequence of descriptors, each of which describes the unique data chunk. The chunk descriptor stream 504 may include the hash value and its location for each unique data chunk. These descriptors further contain information usable by the chunk reference stream 506 to reconstruct the original data stream 320. This includes descriptions of any compression or encryption algorithms applied to the data chunk. The descriptor format is similar to that used for the directory stream as described in U.S. patent application Ser. No. 11/194,137. Descriptors appear in a group which can either be a disk sector or a group of disk sectors. The following are examples of descriptors.

End of Data Entry: This descriptor specifies the end of the user data.

| | | | | Bit | | | | |
|---|---|---|---|---|---|---|---|---|
| Byte | 7 | 6 | 5 | 4 | 3 | 2 | 1 | 0 |
| 0 | | | | Type (00h) | | | | |
| 1 | | | | Pad (000000h) | | | | |
| 2 | | | | | | | | |
| 3 | | | | | | | | |

Skip Entry: This descriptor specifies that this is the last entry in this descriptor set and the next entry is in a subsequent set. This entry may only appear when there is not enough room in the descriptor set to fit another chunk entry.

| | | | | Bit | | | | |
|---|---|---|---|---|---|---|---|---|
| Byte | 7 | 6 | 5 | 4 | 3 | 2 | 1 | 0 |
| 0 | | | | Type (01h) | | | | |
| 1 | | | | Pad (000000h) | | | | |
| 2 | | | | | | | | |
| 3 | | | | | | | | |

Position Entry: This descriptor is located as the first entry of each descriptor set. The data described by the entries that follow starts at the position in an ECC group specified by the ECC Group Offset and the Byte Offset fields. The descriptor describes a set of chunk data records on the removable storage medium and may include one or more of the following: (1) the size of the error correction group used to store the subsequent chunk data records; (2) the number of chunk data records that precede this set of chunk data records; (3) the location of the storage medium block that contains the first byte of the first chunk data record of this set; (4) the position of the chunk data block described by the location of the storage-medium block within the error correction group; and (5) the byte offset within the position of the chunk data block of the first byte of the first chunk data record of this set.

| | | | | Bit | | | | |
|---|---|---|---|---|---|---|---|---|
| Byte | 7 | 6 | 5 | 4 | 3 | 2 | 1 | 0 |
| 0 | | | | Type (02h) | | | | |
| 1 | | | ECC Blocks per ECC Group | | | | | |
| 2 | (LSB) | | Data Blocks per ECC Group | | | | | |
| 3 | | | | | | | | (MSB) |

| Byte | Bit 7 | 6 | 5 | 4 | 3 | 2 | 1 | 0 |
|---|---|---|---|---|---|---|---|---|
| 4 | (LSB) | | | Logical Chunk Address (LCA) | | | | |
| 5 | | | | | | | | |
| 6 | | | | | | | | |
| 7 | | | | | | | | (MSB) |
| 8 | (LSB) | | | Disk Logical Block Address (LBA) | | | | |
| 9 | | | | | | | | |
| 10 | | | | | | | | |
| 11 | | | | | | | | (MSB) |
| 12 | (LSB) | | | ECC Group Offset | | | | |
| 13 | | | | | | | | (MSB) |
| 14 | (LSB) | | | Byte Offset | | | | |
| 15 | | | | | | | | (MSB) |

Single SHA-1 Chunk Entry: This entry describes a single chunk of the specified size. It contains indicators of whether the chunk has been compressed or encrypted and the resulting size. It also contains the SHA-1 hash of the chunk.

| Byte | Bit 7 | 6 | 5 | 4 | 3 | 2 | 1 | 0 |
|---|---|---|---|---|---|---|---|---|
| 0 | | | | Type (03h) | | | | |
| 1 | (LSB) | | | Chunk Size | | | | |
| 2 | | | | | | | | |
| 3 | | | | | | | | (MSB) |
| 4 | RSVD | RSVD | RSVD | RSVD | RSVD | RSVD | ENCR | COMP |
| 5 | (LSB) | | | Modified Size | | | | |
| 6 | | | | | | | | |
| 7 | | | | | | | | (MSB) |
| 8 | (LSB) | | | SHA-1 Hash Value | | | | |
| 27 | | | | | | | | (MSB) |

The chunk reference stream 506 contains a sequence of descriptors which describe the sequence of references to data chunks usable to reconstruct the original data stream 320. The chunk reference stream 506 consists of a list of references to the chunk descriptor stream 504 in terms of Logical Chunk Address (LCA). Descriptors appear in a group which can either be a disk sector or a group of disk sectors. The following are examples of chunk references contained in reference stream 506.

End of Data Entry: This entry specifies the end of the user data.

| Byte | Bit 7 | 6 | 5 | 4 | 3 | 2 | 1 | 0 |
|---|---|---|---|---|---|---|---|---|
| 0 | | | | Type (FFh) | | | | |
| 1 | | | | Pad (FFFFFFh) | | | | |
| 2 | | | | | | | | |
| 3 | | | | | | | | |

Position Entry: This entry is located as the first entry of each descriptor set. It is used as a confirmation by the software to verify the correct descriptor set has been found. The largest LCA field is used to readily determine what the largest chunk address that has been seen is for use in append/erase situations.

| Byte | Bit 7 | 6 | 5 | 4 | 3 | 2 | 1 | 0 |
|---|---|---|---|---|---|---|---|---|
| 0 | (LSB) | | | Logical Index Address (LIA) | | | | |
| 1 | | | | | | | | |
| 2 | | | | | | | | |
| 3 | | | | | | | | (MSB) |
| 4 | (LSB) | | | Largest Logical Chunk Address (LCA) | | | | |
| 5 | | | | | | | | |
| 6 | | | | | | | | |
| 7 | | | | | | | | (MSB) |

Index Entry: This is an index into the chunk descriptor stream 504 in terms of LCA.

| Byte | Bit 7 | 6 | 5 | 4 | 3 | 2 | 1 | 0 |
|---|---|---|---|---|---|---|---|---|
| 0 | (LSB) | | | Logical Chunk Address (LCA) | | | | |
| 1 | | | | | | | | |
| 2 | | | | | | | | |
| 3 | | | | | | | | (MSB) |

The directory stream 508 contains information about host records as described in the U.S. patent application Ser. No. 11/194,137. However, when de-duplication is used, modified entries for position and blocks are used as described below.

De-Dup Position Entry: This entry is located as the first entry of each data directory block. The data described by the entries that follow starts at the Logical Index Address (LIA) specified. The entry describes a set of chunk data records on the removable storage medium and may include one or more of the following: (1) the number of filemarks that precede the set of chunk data records; (2) the number of chunk data records that precede this set of chunk data records; (3) the location of storage medium block that contains the first byte of the first chunk data record of this set.

| Byte | Bit | | | | | | | |
|---|---|---|---|---|---|---|---|---|
| | 7 | 6 | 5 | 4 | 3 | 2 | 1 | 0 |
| 0 | Type (0Bh) | | | | | | | |
| 1 | Reserved | | | | | | | |
| 2 | | | | | | | | |
| 3 | | | | | | | | |
| 4 | (LSB) | | | FM Count | | | | |
| 5 | | | | | | | | |
| 6 | | | | | | | | |
| 7 | | | | | | | | (MSB) |
| 8 | (LSB) | | | Host Logical Block Address (LBA) | | | | |
| 9 | | | | | | | | |
| 10 | | | | | | | | |
| 11 | | | | | | | | (MSB) |
| 12 | (LSB) | | | Logical Index Address (LIA) | | | | |
| 13 | | | | | | | | |
| 14 | | | | | | | | |
| 15 | | | | | | | | |

De-Dup Single Block Entry: This single block entry describes a single host block. It gives the size of the host block and indicates the position in the data stream. The position in the data stream is a specific LIA and LIA byte offset. The LIA is calculated by starting from the LIA in the position entry and adding all of the LIA offset values to the current block. This descriptor allows for an LIA Offset of 14 bits, which based on an average chunk size of 8 KB gives an average maximum host record size of 128 MB (much larger than the 16 MB actually allowed). The LIA Byte Offset of 18 bits allows for a maximum chunk size of 256 KB-1 (64 KB is the likely maximum to be used).

| Byte | Bit | | | | | | | |
|---|---|---|---|---|---|---|---|---|
| | 7 | 6 | 5 | 4 | 3 | 2 | 1 | 0 |
| 0 | Type (0Ch) | | | | | | | |
| 1 | (LSB) | | | Block Size | | | | |
| 2 | | | | | | | | |
| 3 | | | | | | | | (MSB) |
| 4 | (LSB) | | | LIA Offset (14 bits) | | | | |
| 5 | | | (MSB) | | | (LSB) | | |
| 6 | | | LIA Byte Offset (18 bits) | | | | | |
| 7 | | | | | | | | (MSB) |

There are different ways in which the data streams can be organized on a physical medium in terms of Logical Block Address (LBA) range usage. In one embodiment, each stream may be treated as a file. Therefore, a standard file system (ext3, fat16, fat32, NTFS, etc . . . ) may be used to manage the usage of the media. The file based stream organization has the benefit of simplicity from a management perspective. However, it has potential drawbacks for performance and error correction coding (ECC) utilization.

Figure 6:
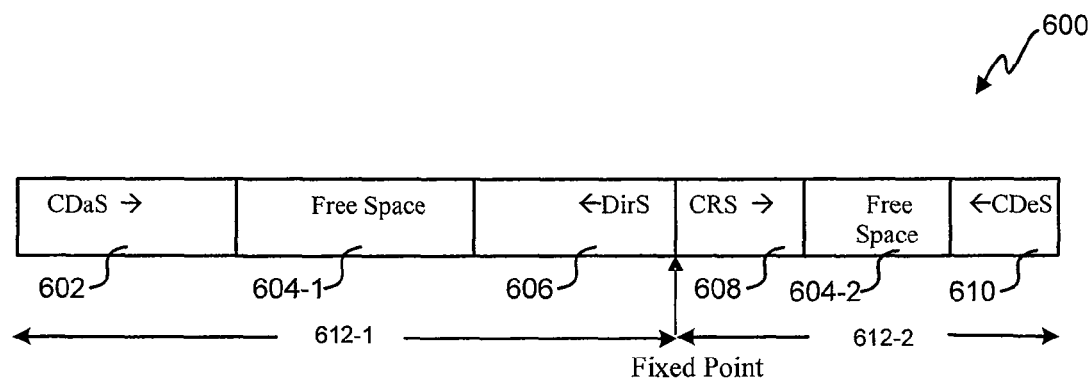
FIG. 6 illustrates an embodiment of a region based stream organization used to store data streams on a removable data cartridge.

Other embodiments may use region based stream organization method. A schematic illustration of a region based stream organization method 600 used to store data streams on a stand-alone removable data cartridge is shown in FIG. 6. In this method, the physical cartridge storage medium is divided in two fixed size regions 612-1 and 612-2. Each fixed size region contains two variable size regions growing towards each other. By way of example, the fixed size region 612-1 may include two variable size regions 602 and 606. The variable size region 602 is provided for the storage of the chunk data stream (CDaS) 502 as logical blocks and the variable size region 606 is provided for the storage of the directory stream (DirS) 508. Each of the chunk data stream 502 and directory stream 508 then grows into an intermediate free area 604-1. The fixed size region 612-2 also includes two variable size regions 608 and 610. In a similar way, the variable size region 608 is provided for the storage of the chunk reference stream (CRS) 506 and the variable size region 610 is provided for the storage of the chunk descriptor stream (CDeS) 504. Each of the chunk reference stream 506 and chunk descriptor stream 504 then grows into an intermediate free area 604-2, as described above. This method is very similar to the organization specified in the U.S. patent application Ser. No. 11/194,137. It will be appreciated that such a specific arrangement is shown for illustrative purposes and is not intended to be limiting. Equivalent physical arrangements of the areas will be evident to those of skill in the art, including, for example, interchanging the fixed size regions 612-1 and 612-2, or interchanging positions of chunk data stream area 602, directory stream area 606, chunk reference stream area 608, or chunk descriptor stream area 610, and the like.

The method described above is optimized for use on data sets which can be contained on a single self-contained storage medium. There may be situations where a data set is larger than a single medium and spans multiple media. In this situation, the strategy detailed above would start with a blank slate on each medium and not try to discover common blocks across medium boundaries. The following method provides a way to allow block references across medium boundaries in order to maximize the effectiveness of the commonality factoring. This avoids the issue of having to start with a blank slate on each new medium. It has the disadvantage of requiring all of the media in a linked set to be present simultaneously in order to successfully recover the data.

Figure 7:
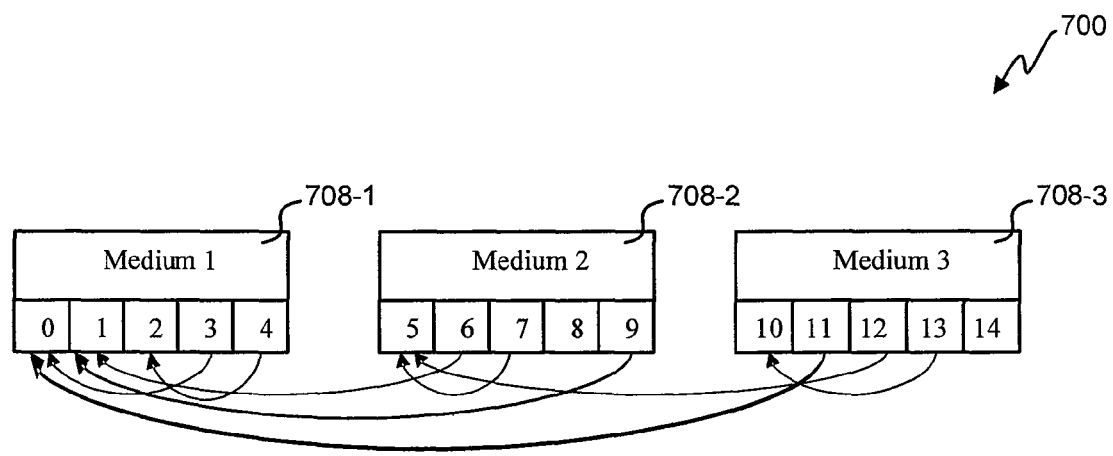
FIG. 7 is a schematic illustration of commonality factored data stored on multiple cartridges utilizing references to blocks across cartridge boundaries.

Referring next to FIG. 7, a schematic illustration of commonality factored data stored on multiple cartridges utilizing references to blocks across cartridge boundaries is shown. In this embodiment, the numbered squares represent the chunks determined through the methods described in the earlier sections. The chunks which are unique have no outgoing arrows, while the duplicate chunks have arrows pointing to the unique chunk that they are a duplicate of. Following the rules of the stand alone cartridge implementation, the following link pairs would not be possible because they cross medium boundaries: (6,1), (9,1), (11,0), and (12,5). Instead of linking to another cartridge, these situations would require storing a copy of the chunk on each cartridge, reducing the effectiveness of the commonality factoring algorithm.

The referencing of chunks across medium boundaries can be accomplished with some fairly minor changes to the format specified earlier. The main change is that the Index Entry in the Chunk Reference Stream 506 also indicates which medium the chunk is stored on. This can be done either by storing a unique media identifier in the Index Entry or by storing a reference to a unique media identifier. In order to limit the storage space required, a reference will be described here. In order for the reference to be meaningful in one embodiment, there is a list of the unique identifiers of the previous media in the media set stored in the metadata of the medium. The reference then can just indicate an offset into this list. The modified entry appears as shown below:

| Byte | Bit | | | | | | | |
|---|---|---|---|---|---|---|---|---|
| | 7 | 6 | 5 | 4 | 3 | 2 | 1 | 0 |
| 0 | (LSB) | | | Logical Chunk Address (LCA) | | | | |
| 1 | | | | | | | | |
| 2 | | | | | | | | |
| 3 | | | | | | | | (MSB) |

-continued

| Byte | Bit | | | | | | | |
|---|---|---|---|---|---|---|---|---|
| | 7 | 6 | 5 | 4 | 3 | 2 | 1 | 0 |
| 4 | (LSB) | Media Reference Number (MRN) | | | | | | |
| 5 | | | | | | | | |
| 6 | | | | | | | | |
| 7 | | | | | | | | (MSB) |

This embodiment allows the commonality factoring process span a large number of media, practically limited only by the available memory in the system for storing chunk information. In the depicted example, three data storage cartridge medium 708 are shown for illustrative purposes and is not intended to be limiting.

The method described above in FIG. 7 provides a way to span a given backup across multiple media in order to increase the effectiveness of the commonality factoring procedure. However, this will still not take advantage of the strongest use of commonality factoring: optimizing the storage of multiple copies of a backup set over a period of time which have significant overlap due to the fact that most data in the backup is not changing. This effect could be taken advantage of by linking a large number of media together and performing multiple full backups to the set. However, this may not be convenient to the user. The user would prefer to get the full benefits of the commonality factoring without requiring the media to be linked. The linking of media can result in the entire set being useless if single media is lost. The user would prefer the media to be self-contained.

Figure 8A:
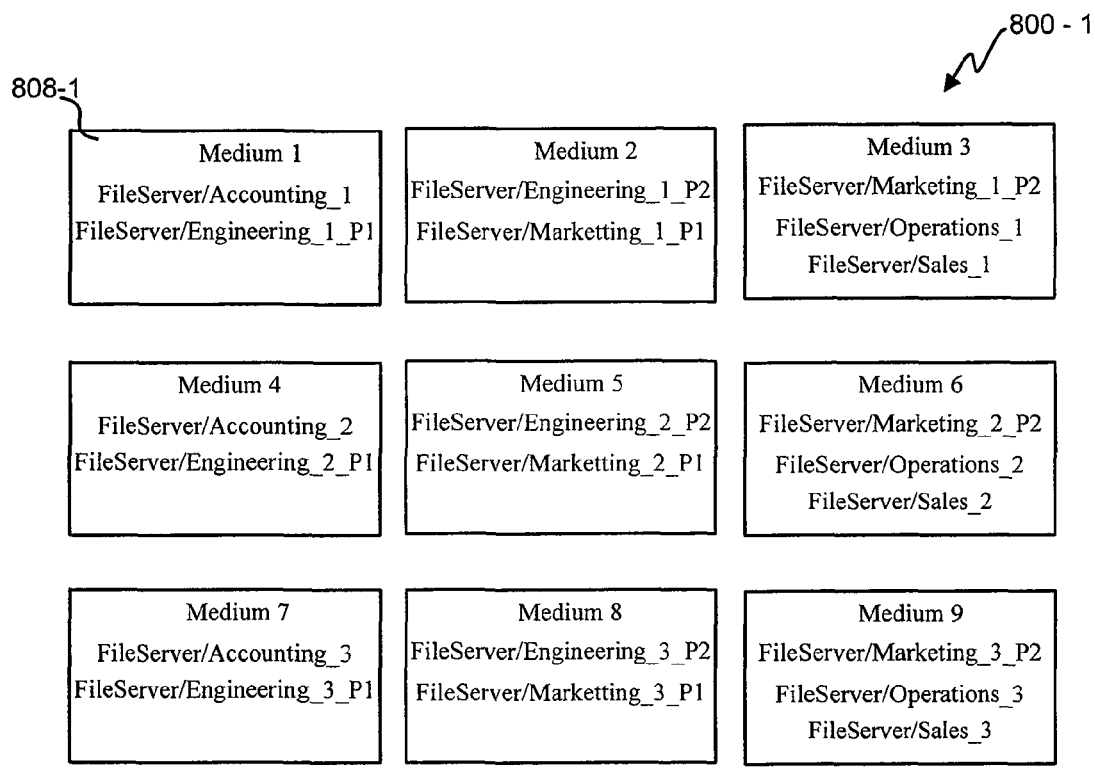
FIGS. 8A and 8B are schematic illustrations of commonality factored data stored on multiple storage cartridges without and with partitioning of data, respectively.

With reference to FIG. 8A, a schematic illustration of commonality factored data stored on multiple storage cartridges without partitioning of data is shown. In a set of storage medium 800-1, the storage of commonality factored data on multiple storage cartridges is done without partitioning of data. An exemplary file server may include the following directory structure: 1) FileServer/Accounting, 2) FileServer/Engineering, 3) FileServer/Marketing, 4) FileServer/Operations, and 4) FileServer/Sales. As shown in FIG. 8A, one way to backup the data is to select the top level directory and back it up to a media set that might consist of three media 808-1 (labeled Medium 1, Medium 2, and Medium 3) to hold the data. The media spanning boundaries would occur randomly within the different subdirectories and a given medium would not be specifically tied to a given sub-directory. When the time came to perform another full backup of the data a week later, three additional media 808-1 (labeled Medium 4, Medium 5, and Medium 6) would be used to store the data and commonality factoring would not be used to find redundancy between the two versions of the accounting directory. This might result in an overall commonality factoring effectiveness of 3-4×.

Figure 8B:
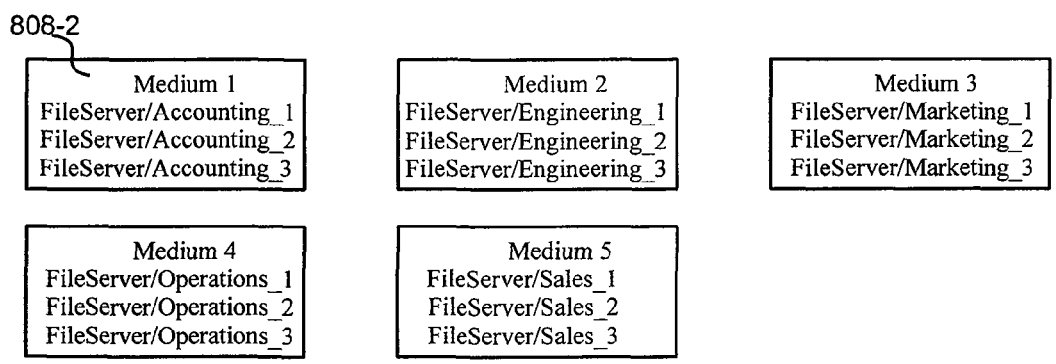

A more effective way to backup the data to is shown in FIG. 8B where the storage of the commonality factored data on the multiple storage cartridges is done with partitioning of data. The use of a set of storage medium 800-2 is based on the idea that data can be broken into subsets of data which are somewhat independent. In this embodiment, a subdirectory of the exemplary file server is stored on each storage cartridge medium 808-2 and subsequent versions of each subdirectory are stored on the same medium. If only 2% of the data has changed since the first backup, this would result in an overall commonality factoring effectiveness of 50×. The naming indicates the version of the directory and the part of the directory in case it is spanned. This embodiment does not allow linking of multiple storage cartridges. In this embodiment, the effectiveness of the commonality factoring is increased substantially by storing the data that is likely to be redundant on the same medium.

Figure 9A:
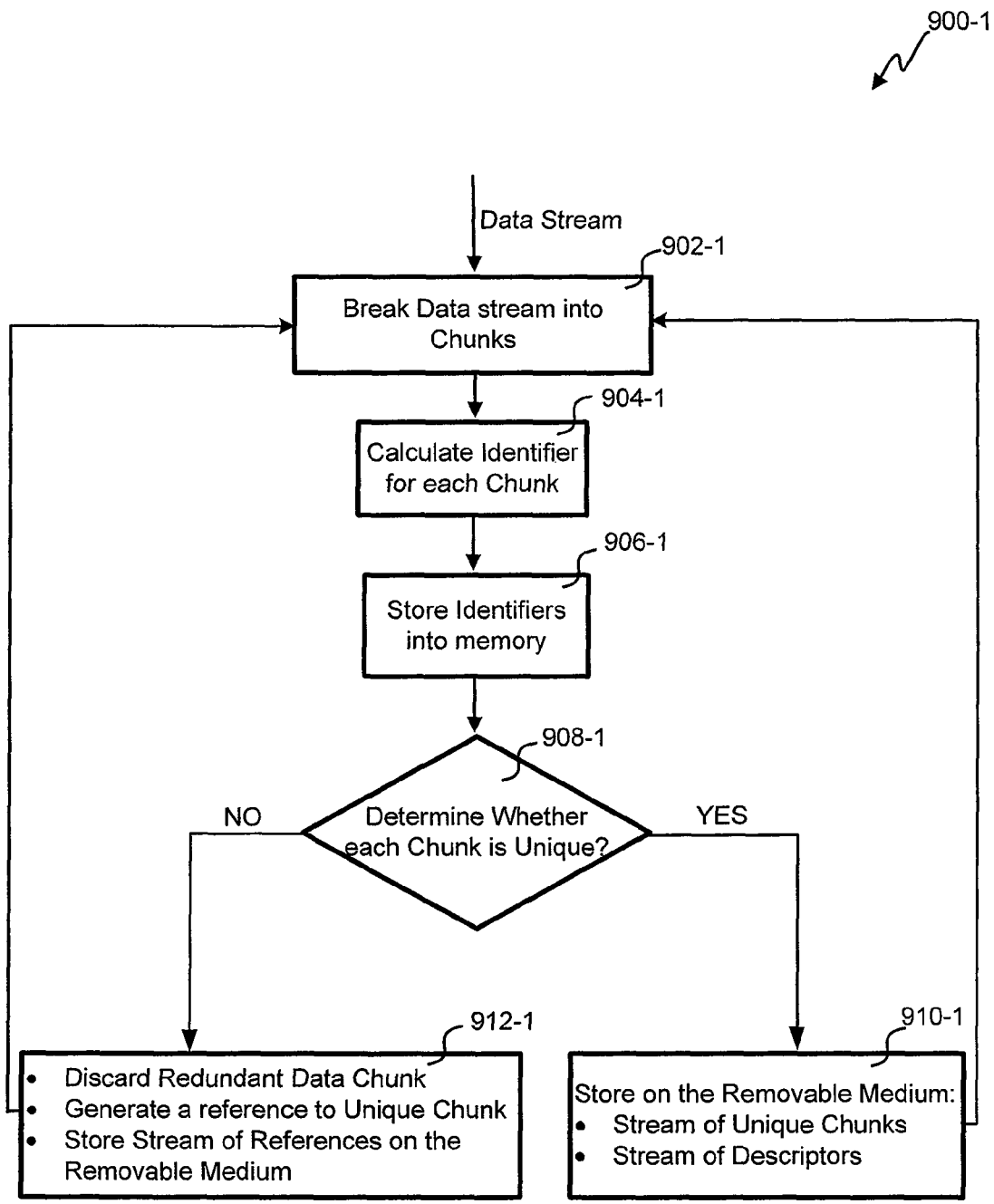
FIGS. 9A and 9B illustrate flow diagrams of example methods for storing data on a removable data cartridge In the appended figures, similar components and/or features may have the same reference label. Further, various components of the same type may be distinguished by following the reference label by a dash and a second label that distinguishes among the similar components. If only the first reference label is used in the specification, the description is applicable to any one the similar components having the same first reference label irrespective of the second reference label.

Referring next to FIG. 9A, an embodiment of a process 900-1 for storing data on a removable storage cartridge is shown. The depicted portion of the process 900-1 begins in block 902-1 where the chunk module 310 breaks the original data stream into stream of data chunks. Once the chunk module 310 creates the stream of chunks, processing continues to block 904-1 where the hash module 312 calculates an identifier for each of the chunks. Different hash algorithms such as message digest algorithm (MD5), secure hash algorithm-1 (SHA-1), and secure hash algorithm-2 (SHA-2) may be used in various embodiments.

The identifiers are then stored into an identifier database 316 at block 906-1. Different searchable data structures such as binary tree data structure, indexed list data structure, and indexed binary tree data structure may be used in various embodiments for storing the identifiers.

A determination is made, at block 908-1 as to whether each chunk is unique in that the same chunk has not been found in the previous chunks. The search module 314 is used at block 908-1 to determine if each chunk is unique by searching the identifier database 316. Different methods and algorithms may be used by the search module 314 in various embodiments. In one embodiment, the step of determining whether each chunk is unique is performed through a search of a hash table indexed by the identifier. In an alternative embodiment, a search of a hash table indexed by a portion of the identifier followed by a search of a list indexed by the remainder of the identifier may be used. Other embodiments may use a search of a hash table indexed by a portion of the identifier followed by a search of a binary tree indexed by the remainder of the identifier.

If the chunk is determined to be unique at block 908-1, processing flows from block 908-1 to block 910-1, where the stream of unique chunks and descriptors are stored on the removable medium. If the chunk is not unique, processing goes from block 908-1 to block 912-1 where the redundant data chunk is discarded and a reference to the existing unique chunk is created. The reference to the existing unique chunk is then stored on the removable medium. The processing then goes back to block 902-1 for performing the commonality factoring.

Figure 9B:
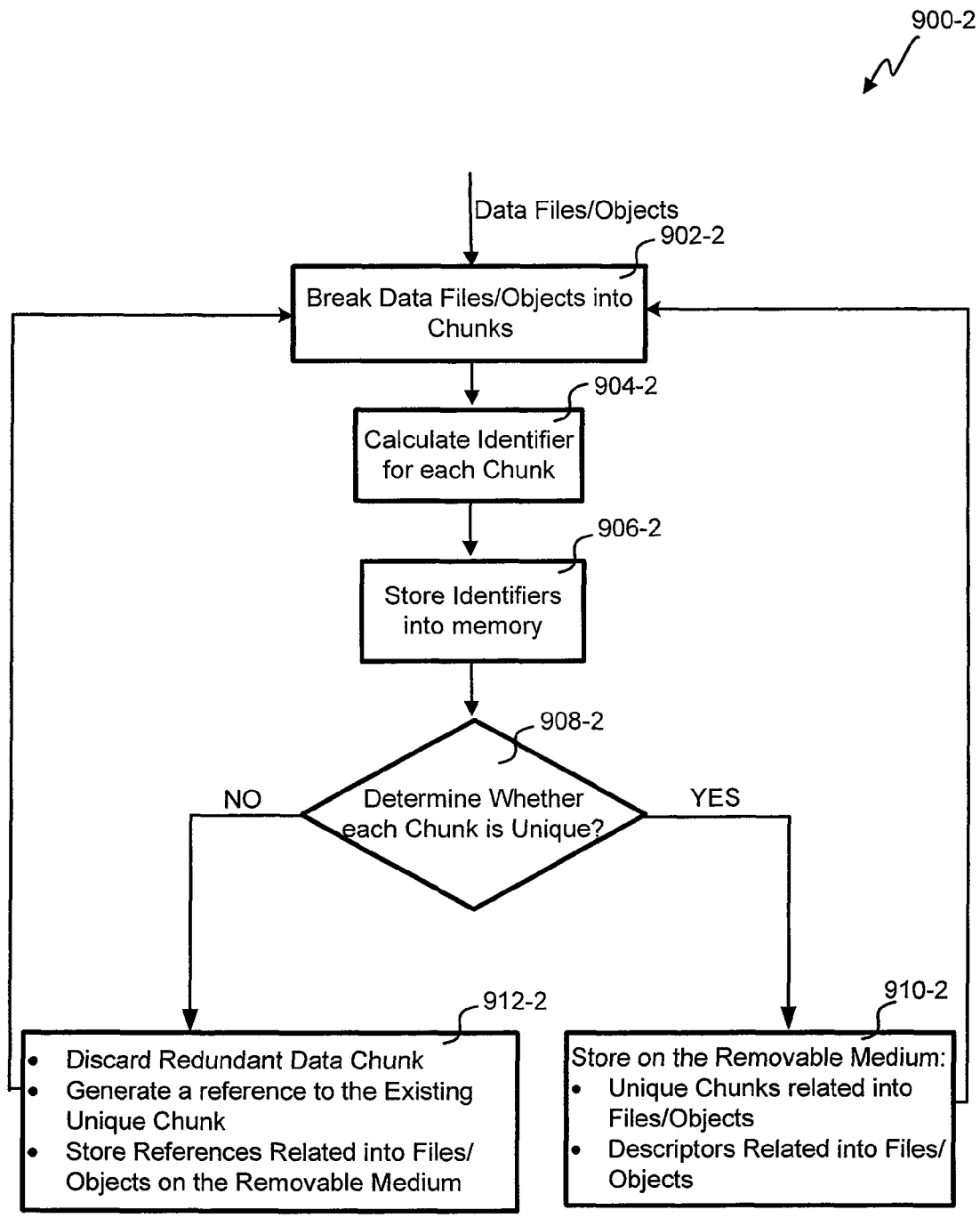

With reference to FIG. 9B, a flow diagram of another embodiment of a process 900-2 for storing data on a removable storage cartridge is shown. In this embodiment, the original data stream may comprise files or objects. In some embodiment, the stream may not be divided into files in a way that is discernable. This embodiment does not differ greatly from the embodiment of FIG. 9A. After determining the uniqueness of each chunk at block 908-2, the unique chunks related into the files/objects and their descriptors are stored on the removable media at block 910-2. The chunks may be stored in non-contiguous (fragmented) regions of the removable storage medium. If the chunk is found to be not unique, the redundant data is discarded and a reference to the existing unique chunk is generated. The generated references related into files/objects are then stored on the removable media at block 912-2 and the processing goes back to block 902-2 for performing the commonality factoring.

While the principles of the disclosure have been described above in connection with specific apparatuses and methods, it is to be clearly understood that this description is made only by way of example and not as limitation on the scope of the invention.

What is claimed is:

1. An apparatus for storing data with a removable medium, the apparatus comprising:
   a chunk module configured to receive an original data stream and break the original data stream into chunks;
   a hash module coupled to the chunk module and configured to calculate an identifier for each chunk and to store the identifiers; and
   a search module coupled to the removable medium, wherein the search module is configured to:
      determine, based on the identifiers, whether each chunk is unique, and store on the removable medium, at least two of a following:
         a stream of the unique chunks,
         a stream of descriptors describing each of the unique chunks, or
         a stream of references indicating a sequence of the unique chunks usable to reconstruct the original data stream, wherein the removable medium comprises a drive cartridge and the at least two streams of the unique chunks, the descriptors or the references are each stored in a separate region of memory in the drive cartridge.

2. The apparatus for storing data with a removable medium of claim 1, wherein the search module is configured to store at least two streams of the unique chunks, the descriptors, or the references in a first region of the separate regions and a second region of the separate regions such that a first stream in the first region grows toward a second stream in the second region and the second stream in the second region grows toward the first stream in the first region.

3. The apparatus for storing data with a removable medium of claim 1, wherein the drive cartridge comprises a hard drive or solid state drive.

4. The apparatus for storing data with a removable medium of claim 1, wherein the removable medium comprises a plurality of drive cartridges.

5. The apparatus for storing data with a removable medium of claim 1, wherein the chunk module is further configured to break the original data stream into chunks by determining chunk boundaries through comparison between a subset of the bits returned from a sliding window algorithm and a predetermined value, whereby a match to the predetermined value designates the chunk boundary.

6. The apparatus for storing data with a removable medium of claim 1, wherein the hash module is further configured to calculate the unique identifiers using Secure Hash Algorithm-1 (SHA-1).

7. The method for storing data with a removable medium of claim 1, wherein the search module is further configured to determine whether each chunk is unique by searching a hash table indexed by the identifiers.

8. The apparatus for storing data with a removable medium of claim 1, wherein the search module is further configured to store host objects comprising virtual tape volumes for an existing tape format.

9. The apparatus .for storing data with a removable medium of claim 7, wherein the hash table comprises a location on the removable medium for each descriptor, the location corresponding to where the associated unique chunk is stored.

10. The apparatus for storing data with a removable medium of claim 1, wherein the hash module stores the identifiers in a low latency memory.

11. A method for storing data with a plurality of removable media, comprising steps of:
   breaking an original data stream into chunks;
   calculating an identifier for each chunk;
   storing the identifiers;
   determining, based on the identifiers, whether each chunk is unique; and
   storing on the plurality of removable media, at least two of a following:
      a stream of the unique chunks,
      a stream of descriptors describing each of the unique chunks, and
      a stream of references indicating a sequence of the unique chunks usable to reconstruct the original data stream, wherein:
         the stream of references stored in each medium includes a medium identifier, and
         the medium identifier allows correlation of the references to the chunks on the different removable media.

12. A machine-readable medium having machine-executable instructions configured to perform the machine-implementable method for storing data with a plurality of removable medium of claim 11.

13. A method for storing data on a removable storage unit, comprising:
   breaking original data into chunks;
   calculating an identifier for each chunk;
   storing the identifiers in a low latency memory;
   determining, based on the identifiers, whether each chunk is unique; and
   storing on the storage unit at least two of a following:
      a stream of the unique chunks,
      a stream of descriptors describing each of the unique chunks, or
      a stream of references indicating a sequence of the unique chunks used to reconstruct the original data, wherein the at least two streams of the unique chunks, the descriptors or the references are each stored as a separate file.

14. The method for storing data of claim 13, wherein the storage unit comprises a single cartridge.

15. The method for storing data of claim 13, wherein the storage unit comprises a plurality of cartridges.

16. The method for storing data of claim 15, wherein the references stored in each cartridge includes a medium identifier in each entry for allowing the references to the chunks on the different cartridges.

17. The method for storing data of claim 13, wherein the storage unit is removable.

18. A machine-readable medium having machine-executable instructions configured to perform the machine-implementable method for storing data on a storage unit of claim 13.

* * * * *

UNITED STATES PATENT AND TRADEMARK OFFICE
CERTIFICATE OF CORRECTION

PATENT NO.         : 8,046,509 B2
APPLICATION NO.    : 12/167872
DATED              : October 25, 2011
INVENTOR(S)        : Matthew D. Bondurant It is certified that error appears in the above-identified patent and that said Letters Patent is hereby corrected as shown below:

| Column | Line | | Should Be |
|---|---|---|---|
| 12 | 25 | Pad (000000h) is in row 1 | Pad (000000h) should be in row 2 |
| 12 | 40 | Pad (000000h) is in row 1 | Pad (000000h) should be in row 2 |
| 13 | 6 | Logical Chunk Address (LCA) is in row 4 | Logical Chunk Address (LCA) should be in row 5 |
| 13 | 10 | Disk Logical Block Address (LBA) is in row 8 | Disk Logical Block Address (LBA) should be in row 9 |
| 13 | 26 | Chunk Size is in row 1 | Chunk Size should be in row 2 |
| 13 | 30 | Modified Size is in row 5 | Modified Size should be in row 6 |
| 13 | 34 | SHA-1 Hash Value is in row 8 | SHA-1 Hash Value should be in a blank row between rows 8 and 27 |
| 13 | 58 | Pad (FFFFFFh) is in row 1 | Pad (FFFFFFh) should be in row 2 |
| 14 | 9 | Logical Index Address (LIA) is in row 0 | Logical Index Address (LIA) should be in row 1 |
| 14 | 13 | Largest Logical Chunk Address (LCA) is in row 4 | Largest Logical Chunk Address (LCA) should be in row 5 |
| 14 | 46 | Logical Chunk Address (LCA) is in row 0 | Logical Chunk Address (LCA) should be in row 1 |
| 15 | 7 | Reserved is in row 1 | Reserved should be centered between rows 1 and 3 |
| 15 | 10 | FM Count is in row 4 | FM Count should be in row 5 |
| 15 | 13 | Host Logical Block Address (LBA) is in row 8 | Host Logical Block Address (LBA) should be in row 9 |
| 15 | 15 | Logical Index Address (LIA) is in row 12 | Logical Index Address (LIA) should be in row 13 |
| 15 | 40 | Block Size is in row 1 | Block Size should be in row 2 |
| 16 | 64 | Logical Chunk Address (LCA) is in row 0 | Logical Chunk Address (LCA) should be in row 1 |

Signed and Sealed this
Tenth Day of July, 2012

David J. Kappos
*Director of the United States Patent and Trademark Office*

CERTIFICATE OF CORRECTION (continued)
U.S. Pat. No. 8,046,509 B2

| | | | |
|---|---|---|---|
| 17 | 7 | Media Reference Number (MRN) is in row 4 | Media Reference Number (MRN) should be in row 5 |

Claims

| Column | Line | PTO | Should Be |
|---|---|---|---|
| 19 | 57 | apparatus .for storing | apparatus for storing |